(No Model.)　　　　　　　　F. C. LANG.　　　　　2 Sheets—Sheet 2.
VEHICLE RUNNING GEAR.

No. 602,511.　　　　　　　　　　Patented Apr. 19, 1898.

WITNESSES:
Edwin L. Bradford
Harry L. Marsh

INVENTOR
Frank C. Lang,
BY
Finckel & Finckel,
ATTORNEYS

UNITED STATES PATENT OFFICE.

FRANK C. LANG, OF COLUMBUS, OHIO.

VEHICLE RUNNING-GEAR.

SPECIFICATION forming part of Letters Patent No. 602,511, dated April 19, 1898.

Application filed December 18, 1897. Serial No. 662,406. (No model.)

*To all whom it may concern:*

Be it known that I, FRANK C. LANG, a citizen of the United States, residing at Columbus, in the county of Franklin and State of Ohio, have invented certain new and useful Improvements in Vehicle Running-Gears; and I do hereby declare the following to be a full, clear, and exact description of the invention, such as will enable others skilled in the art to which it appertains to make and use the same.

My invention relates more particularly to that class of wagons in which the bottom of the body between the axles is depressed or constructed to lie considerably below the horizontal plane of the axles to afford easy ingress and egress of the driver, such wagons being designed more especially for the use of milkmen, butchers, and others whose business is to make numerous deliveries of edibles and other things within a short period of time. It is obvious that such wagons should be light in weight, as well as strong and durable, and also that they be capable of turning in a very narrow space, because it is often necessary that they be driven into alleys or narrow streets in order that the deliveries may be made.

The object of my invention is to provide an improved running-gear for such wagons in which the king-bolt and front axle is extended or thrown considerably forward of the front of the wagon, such a placing of the king-bolt and construction of the running-gear permitting a considerable shortening of the body and enabling one or the other of the front wheels to be turned squarely under the front of the wagon, whereby the wagon may be turned within its own length, the hind wheels serving practically as a pivot.

Figure 1:
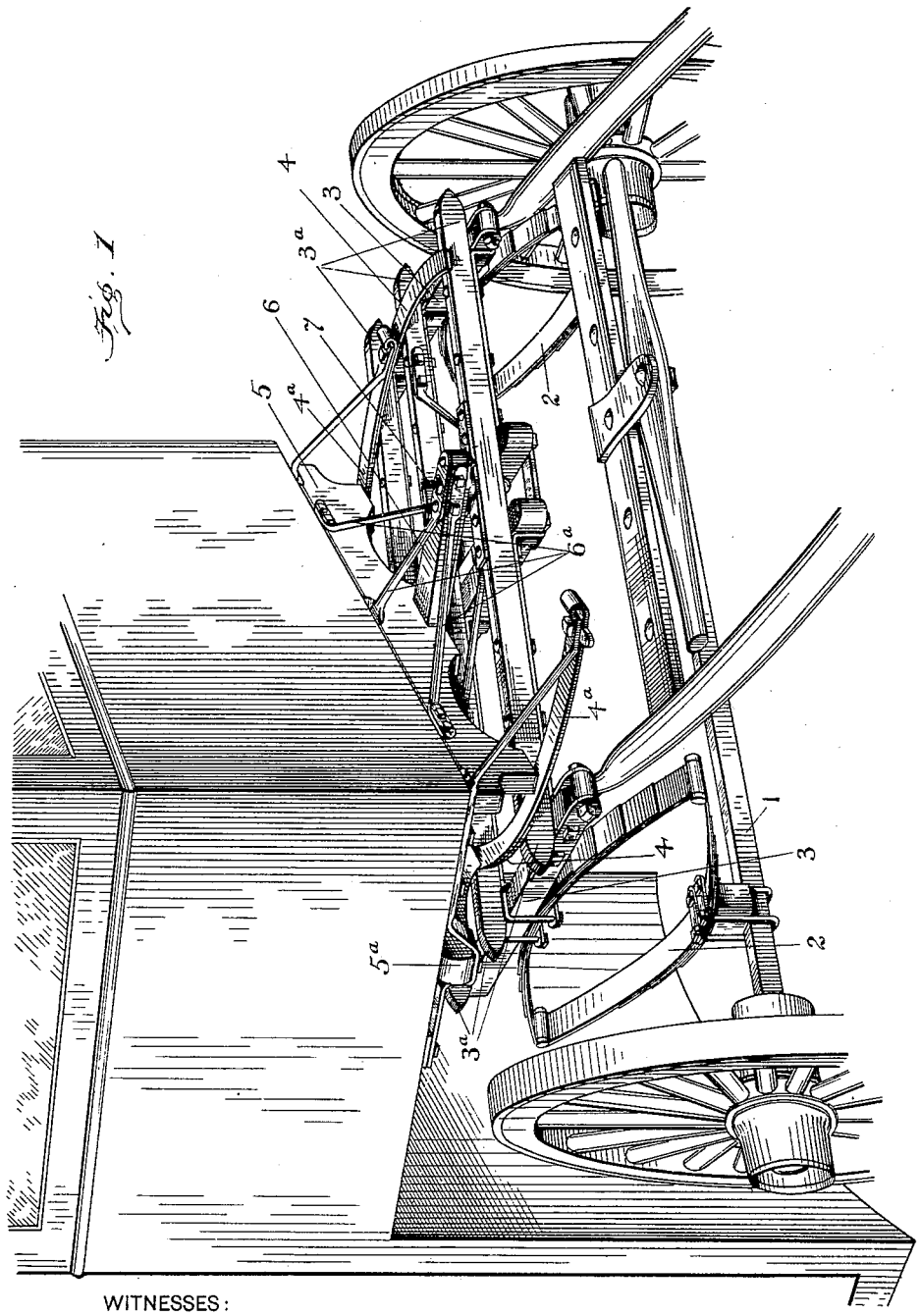
Figure 2:
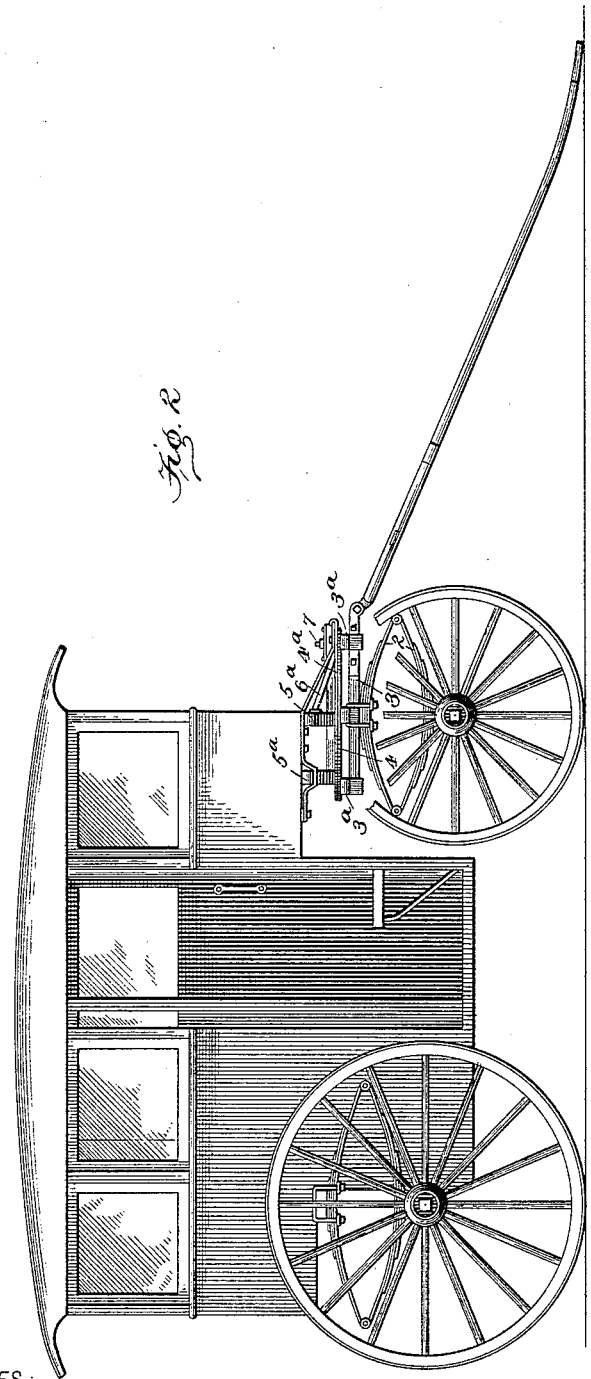

In the annexed drawings I have presented in Figure 1 a perspective view of the front portion of the wagon, showing the details of the construction, and in Fig. 2 a side elevation, the upper portion of the near front wheel being broken out.

1 designates the front axle, which has secured to it by means of clips ordinary elliptical springs 2. Upon these springs I secure by means of suitable clips a platform consisting, essentially, of the side bars 3 and crossbars 3ª, all suitably braced to secure strength, and upon this platform is placed the lower part 4 of the so-called "fifth-wheel," which consists of a semicircular strip of metal.

Arranged transversely under the front portion of the body of the wagon are timbers or bars 5 and 5ª, in which is secured centrally and longitudinally of the wagon what I shall term the "king-bolt" bar, the forward end of which projects considerably beyond the plane of the front of the wagon. This king-bolt bar is further braced and secured against lateral and longitudinal strains by means of iron rods 6, secured to the front of the wagon.

The upper part 4ª of the fifth-wheel consists of a semicircular plate corresponding in size and shape to the lower part 4, and said upper part is secured to the under side of the crosstimbers 5 and 5ª, so that its ends shall stand in line with the end of the king-bolt bar. In other words, these ends shall project beyond the plane of the front part of the wagon a distance equaling the projection of the king-bolt bar. The king-bolt 7 is passed up through the middle of the front bar of the platform heretofore referred to and through the end of the king-bolt bar, where it is fastened with a nut. The position of the king-bolt is of course located at the center of the circle of which the parts constituting the fifth-wheel form an arc, so that when the gear or platform is turned the said parts shall be as largely in contact with each other as practicable.

From the construction herein shown and described it will be observed that when the front wheels are turned a large part of the running-gear is projected or thrown beyond the front of the wagon without materially affecting the stability of the wagon upon the gear. This permits the making of the front portion of the wagon—that is, the portion forward of the depressed or lowered bottom—short, while at the same time allowing the axle to be turned through a quarter-circle or squarely around to effect a short turning of the vehicle, and considering that economy of construction and weight is effected at the front portion a little more liberality may be practiced in the construction of the low-down portion to provide a wider door and more footroom for the driver without materially increasing the weight and cost of the vehicle.

Another advantage incident to my improved running-gear for this class of wagons is that the horse, while perhaps not much nearer the driver than formerly, is more easily and completely viewed by him.

What I claim, and desire to secure by Letters Patent, is—

The herein-described running-gear for milk-wagons and the like, consisting of a platform supported on the front axle, the lower part of the fifth-wheel secured upon said platform in combination with the king-bolt bar projecting considerably beyond the front of the wagon, the upper part of the fifth-wheel of similar shape and size as the lower part of the fifth-wheel secured to the under side of the forward end of the wagon and also projecting beyond the front of the wagon, and a king-bolt passing through the platform and the end of the king-bolt bar, substantially as described.

In testimony whereof I have hereunto set my hand this 2d day of December, 1897.

FRANK C. LANG.

Witnesses:
 GEO. M. FINCKEL,
 LEWIS L. RANKIN.